(12) United States Patent
Cha et al.

(10) Patent No.: US 8,837,404 B2
(45) Date of Patent: Sep. 16, 2014

(54) METHOD OF UPDATING SYSTEM INFORMATION IN WIRELESS COMMUNICATION SYSTEM

(75) Inventors: Jae Sun Cha, Daejeon (KR); Juhee Kim, Daejeon (KR); Soojung Jung, Daejeon (KR); Eunkyung Kim, Daejeon (KR); Kwang Jae Lim, Daejeon (KR); Hyun Lee, Daejeon (KR); Chul Sik Yoon, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 167 days.

(21) Appl. No.: 13/392,842

(22) PCT Filed: Aug. 26, 2010

(86) PCT No.: PCT/KR2010/005737
§ 371 (c)(1),
(2), (4) Date: Feb. 27, 2012

(87) PCT Pub. No.: WO2011/025279
PCT Pub. Date: Mar. 3, 2011

(65) Prior Publication Data
US 2012/0176985 A1 Jul. 12, 2012

(30) Foreign Application Priority Data

Aug. 28, 2009 (KR) .................. 10-2009-0080793
Aug. 23, 2010 (KR) .................. 10-2010-0081349

(51) Int. Cl.
*H04W 48/10* (2009.01)
*H04L 27/26* (2006.01)

(52) U.S. Cl.
CPC ........... *H04L 27/2602* (2013.01); *H04W 48/10* (2013.01)

USPC ........................................................ 370/329

(58) Field of Classification Search
None
See application file for complete search history.

(56) References Cited

U.S. PATENT DOCUMENTS

| 6,553,031 | B1 * | 4/2003 | Nakamura et al. | ............ 370/392 |
| 2004/0260718 | A1 * | 12/2004 | Fedorov | ........................ 707/102 |
| 2006/0159061 | A1 | 7/2006 | Takano et al. | |
| 2010/0002631 | A1 * | 1/2010 | Cho et al. | ....................... 370/328 |
| 2010/0205283 | A1 * | 8/2010 | Cho et al. | ....................... 709/221 |
| 2010/0222055 | A1 | 9/2010 | Cho et al. | |
| 2011/0110341 | A1 * | 5/2011 | Yuk et al. | ....................... 370/336 |

FOREIGN PATENT DOCUMENTS

| KR | 2005-0110644 A | 11/2005 |
| KR | 2006-0078667 A | 7/2006 |
| KR | 2009-0029620 A | 3/2009 |

\* cited by examiner

*Primary Examiner* — Chirag Shah
*Assistant Examiner* — Rina Pancholi
(74) *Attorney, Agent, or Firm* — Rabin & Berdo, PC

(57) ABSTRACT

The present invention provides a method of a Base Station (BS) updating system information using a superframe structure in a wireless communication system, comprising transmitting a primary header including system scheduling information pertinent to an update of the system information and transmitting an updated secondary header. The system scheduling information comprises secondary header change state information indicating a change state of the updated secondary header, secondary header applying information indicating whether the secondary header change state information is applied to a current system, and a secondary header change indicator indicating the updated secondary header.

13 Claims, 10 Drawing Sheets

METHOD OF UPDATING SYSTEM INFORMATION IN WIRELESS COMMUNICATION SYSTEM

BACKGROUND OF THE INVENTION

1. Field of the Invention

The present invention relates to a wireless communication system, and more particularly to a method of updating system information in a wireless communication system.

2. Discussion of the Related Art

System Information (SI) includes various pieces of information about a radio environment, such as code information and a power level used in a current cell or neighbor cells. A user equipment (UE) has to receive system information about a new BS when the UE is first registered to a BS system or performs handover to a new BS. The UE can know the state of the BS using the system information and can know a method and procedure of accessing the BS when accessing the BS.

When the Radio Resource Control (RRC) layer of a specific UE is connected to the RRC layer of a BS so that they can exchange RRC messages, it is said that the corresponding UE is in the RRC-connected state. When they are not connected to each other, it is said that the corresponding UE is in the idle state. When a UE is in the idle state and switched to the RRC-connected state, the UE attempts access using an access method based on system information acquired by a BS.

A BS can update some or all pieces of system information, when necessary. Before applying updated system information to a system, the BS first informs a UE whether system information has been updated so that the UE is prepared to receive the updated system information.

In conventional arts, since updated system information is transmitted only once, there is a problem that UEs failing to receive radio frames in which the updated system information is transmitted are unable to access a system until the UEs receive the updated system information. The typical transmission period of system information is set to a relatively long time. Accordingly, a communication recovery time during which the UEs receive the newly transmitted system information is also delayed. This becomes a factor to deteriorate the service quality of UEs. Accordingly, there is a need for a more reliable method of updating system information.

SUMMARY OF THE INVENTION

In an aspect of the present invention, a method of updating system information using a superframe structure in a wireless communication system performed by a Base Station (BS) is provided. The method includes transmitting a primary header including system scheduling information regarding an update of the system information, and transmitting an updated secondary header.

The system scheduling information comprises secondary header change state information indicating a change state of the updated secondary header, secondary header applying information indicating whether the secondary header change state information is currently applied to a system, and a secondary header change indicator indicating the updated secondary header.

In another aspect of the present invention a method of updating system information using a superframe structure in a wireless communication system performed by a User Equipment (UE) is provided. The method includes receiving, from a BS, a primary header comprising first secondary header change state information indicating a change state of a current secondary header and secondary header applying information indicating which one is currently applied to the system between the first secondary header change state information and second secondary header change state information which is a previous version of the first secondary header change state information saved in the UE, and applying the first secondary header change state information to a system if the secondary header applying information indicates the first secondary header change state information.

Although a UE fails to receive updated system information at a specific point of time, the UE can receive the updated system information at a different point of time before the updated system information is actually applied to a system. Accordingly, stable communication can be performed. Further, a UE can know when to apply updated system information starting from which point of time on the basis of S-SFH applying information. Accordingly, there is an advantage in that a mobile UE being served can update system information without deterioration in the quality of service.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

The following technologies can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single-Carrier Frequency Division Multiple Access (SC-FDMA). The CDMA system can be implemented using radio technology, such as Universal Terrestrial Radio Access (UTRA) or CDMA2000. The TDMA system can be implemented using radio technology, such as Global System for Mobile communications (GSM), General Packet Radio Service (GPRS), or Enhanced Data Rates for GSM Evolution (EDGE). The OFDMA system can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). The UTRA is part of a Universal Mobile Telecommunications System (UMTS). $3^{rd}$ Generation Partnership Project (3GPP) Long Term Evolution (LTE) is part of Evolved UTMS (E-UMTS) using Evolved-UMTS Terrestrial Radio Access (E-UTRA). The 3GPP LTE adopts OFDMA in downlink and SC-FDMA in uplink.

Figure 1:
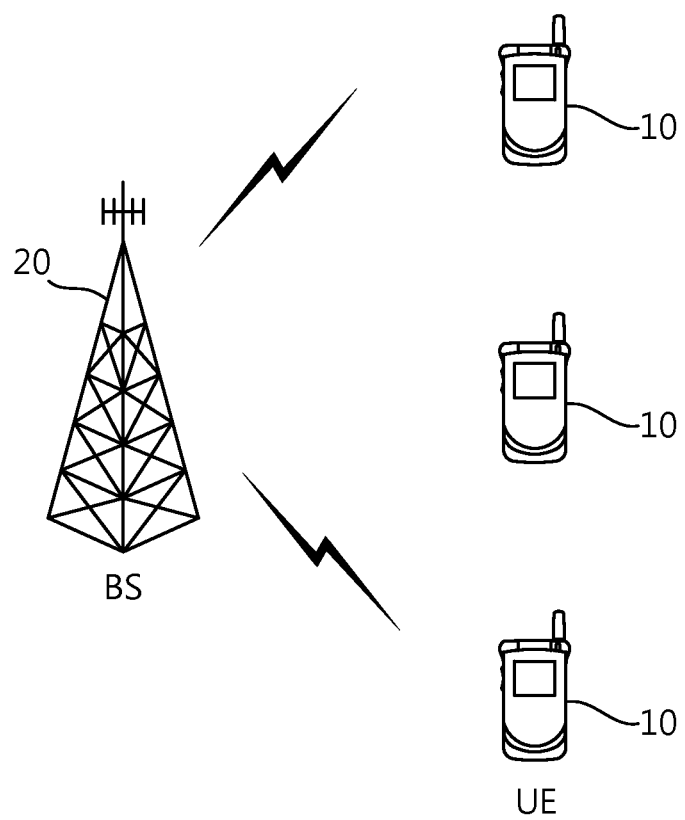
FIG. 1 is a diagram showing a wireless communication system.

FIG. 1 is a diagram showing a wireless communication system. The wireless communication systems are widely deployed in order to provide a variety of communication services, such as voice and packet data.

Referring to FIG. 1, the wireless communication system includes User Equipments (UEs) 10 and a Base Station (BS) 20. The UE 10 can be fixed or mobile and referred to as another terminology, such as a Mobile Station (MS), an Advanced Mobile Station (AMS), a User Terminal (UT), a Subscriber Station (SS), or a wireless device. In general, the BS 20 refers to a fixed station which communicates with the UEs 10, and it can be referred to as another terminology, such as an Advanced Base Station (ABS), a Node-B, a Base Transceiver System (BTS), or an access point. One or more cells can exist in one single BS 20.

Hereinafter, downlink (DL) refers to communication from the BS 20 to the UE 10, and uplink (UL) refers to communication from the UE 10 to the BS 20. In downlink, a transmitter can be part of the BS 20, and a receiver can be part of the UE 10. In uplink, a transmitter can be part of the UE 10, and a receiver can be part of the BS 20. Although an IEEE 802.16m system is chiefly described as an example in order to clarify descriptions, the technical spirit of the present invention is not limited thereto.

Figure 2:
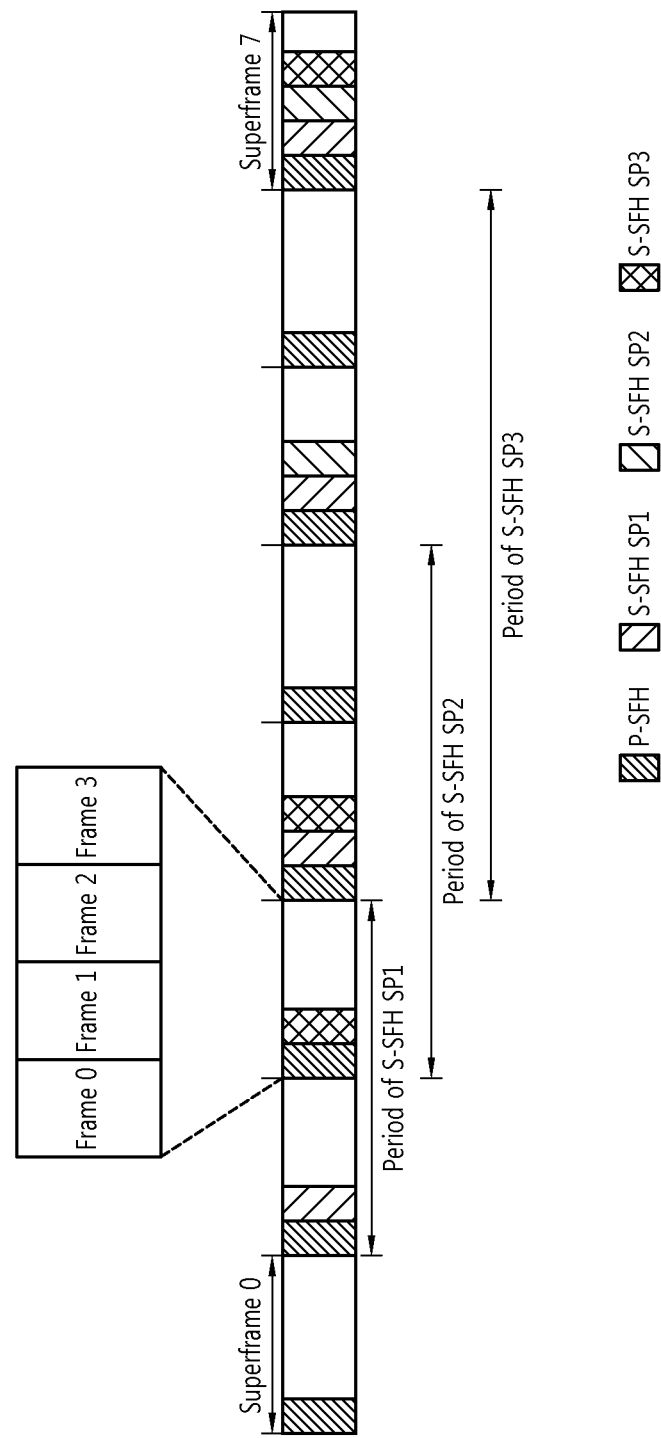
FIG. 2 shows an example of a frame structure.

FIG. 2 shows an example of a frame structure.

Referring to FIG. 2, a superframe includes a superframe header and four frames Frame0 to Frame3. In case where the superframe is used, the transmission efficiency can be increased because the transmission period of control information that needs not to be frequently transmitted can be increased up to the unit of a superframe. Further, a delay characteristic in data transmission in which a retransmission mechanism is taken into consideration can be reduced because data allocation and scheduling are performed in the unit of a frame or a subframe most frequently.

A single frame includes 8 subframes SF0, SF1, SF2, SF3, SF4, SF5, SF6, and SF7. Each subframe can be used for uplink or downlink transmission. The subframe can consist of 6 or 7 OFDM symbols, but not limited thereto. Time Division Duplex (TDD) or Frequency Division Duplex (FDD) can be applied to a frame. In TDD, each subframe is used as uplink or downlink at different times in the same frequency. That is, subframes within a TDD frame are classified into an UL subframe and a DL subframe in the time domain. In FDD, each subframe is used as uplink or downlink at different frequencies in the same time. That is, subframes within an FDD frame are classified into an UL subframe and a DL subframe in the frequency domain. UL transmission and DL transmission occupy different frequency bands, and they can be performed at the same time.

A superframe header can be disposed foremost in a superframe and assigned a common control channel. The common control channel is used to transmit control information which can be used in common by UEs within a cell, such as system information or information about frames constituting the superframe. The superframe header includes a Primary Superframe Header (P-SFH) and a Secondary Superframe Header (S-SFH). The P-SFH is included in each superframe and used to inform whether a secondary superframe is included in a current superframe, change state information of system information supported by a current superframe, and so on.

The S-SFH is classified into three types of secondary superframe header subpackets (S-SFH SubPacket; S-SFH SP) according to their characters. Each of the S-SFH SPs is used to broadcast pieces of system information which has to be known to a mobile UE in order to access a BS to the mobile UE. The S-SFH SP can be transmitted in a different transmission period on the basis of a character of system information included therein. For example, an S-SFH SP1 can be transmitted in two superframe periods, an S-SFH SP2 can be transmitted in three superframe periods, and an S-SFH SP3 can be transmitted in four superframe periods.

Hereinafter, the primary superframe header (P-SFH) is referred to as a primary header and the secondary superframe header (S-SFH) is referred to as a secondary header, for convenience sake.

The primary header is included in the first frame of each superframe, and it includes system scheduling information, such as that shown in the following table.

TABLE 1

| SYNTAX | SIZE (BIT) |
| --- | --- |
| LSB of Superframe Number | 4 |
| S-SFH Change Count | 4 |
| S-SFH Size | 4 |
| S-SFH Transmission Format | 2 |
| S-SFH Scheduling Information bitmap | 3 |
| S-SFH SP Change Bitmap | 3 |
| Reserved | 4 |

S-SFH change state information indicates the change state of a secondary header and may also be referred to as an S-SFH change count. The S-SFH change state information indicates the change state of a secondary header currently being transmitted. The state of a secondary header is changed when parameters constituting the secondary header are changed. If the state of the secondary header is not changed, the S-SFH change state information is not changed. If the state of the secondary header is changed, the S-SFH change state information is increased by 1 modulo 16. A UE can check whether the state of the secondary header has changed on the basis of the S-SFH change state information. If newly received S-SFH change state information is identical with previously received S-SFH change state information, a UE can know that the state of a secondary header has not changed and thus does not need to decode the secondary header according to the newly received S-SFH change state information. If newly received S-SFH change state information is different from previously received S-SFH change state information, a UE can know that the state of a secondary header has changed and thus decodes the secondary header according to the newly received S-SFH change state information.

An S-SFH change indicator indicates which type of a secondary header has changed, and it may also be referred to as an S-SFH SP change bitmap. The S-SFH change indicator is in form of a bitmap. Each bit of the bitmap indicates the change state of a secondary header subpacket of a corresponding specific type. For example, regarding three secondary header subpackets, the S-SFH change indicator has 3 bits, and the first, second, and third bits are mapped to a first secondary header subpacket, a second secondary header subpacket, and a third secondary header subpacket, respectively. If any one of the three secondary header subpackets is changed, a bit corresponding to the changed secondary header subpacket is set to 1. Since the state of a secondary header has changed because of a change in the secondary header subpacket, the S-SFH change state information is increased by 1.

Once the state of a secondary header is changed, all the parameters of the secondary header are not changed during at least one secondary header change cycle until the S-SFH change state information is changed again, but remains unchanged.

In order for a UE to sufficiently receive a changed secondary header, the changed secondary header can be repeatedly transmitted over one or more superframes.

A process of updating system information according to the present invention is chiefly divided into two processes. The first process is a process of a BS informing a UE of updated system information. The second process is a process of the BS informing the UE whether the updated system information is actually applied to a system. The two processes can be independently performed. For example, a BS can previously inform a UE of new system information several times and apply the new system information to a system at an appropriate point of time. That is, a UE does not immediately use updated system information although it has received the updated system information and uses the updated system information on the basis of information about the application of the updated system information. Since the transmission of the updated system information is separated from the application of the updated system information, a BS must include information about the application of the updated system information in system scheduling information and transmit the information to the UE. Information about the application of system information is referred to as S-SFH applying information and included in system scheduling information, such as that shown in Table 2.

TABLE 2

| SYNTAX | SIZE (BIT) |
|---|---|
| LSB of Superframe Number | 4 |
| S-SFH Applying Information | 1 |
| S-SFH Change State Information | 4 |
| S-SFH Size | 4 |
| S-SFH Transmission Format | 2 |
| S-SFH Scheduling Information bitmap | 3 |
| S-SFH Change Indicator | 3 |
| Reserved | 4 |

In Table 2, the S-SFH change state information and the S-SFH change indicator are the same as those described in Table 1.

The S-SFH applying information is information to explicitly indicate a secondary header of which S-SFH change state information is applied in a current superframe. The S-SFH applying information can also be referred to as an S-SFH applying offset.

In an embodiment, the S-SFH applying information is 1-bit information to indicate whether S-SFH change state information of a version currently being transmitted is currently being applied to a system. For example, in case where the S-SFH applying information indicates 1, the S-SFH applying information indicates that S-SFH change state information currently being transmitted is not currently applied to a system. In this case, S-SFH change state information that was previously transmitted and stored is applied to the current system. That is, the S-SFH change state information currently being transmitted has a different state from the S-SFH change state information actually applied to a system. On the contrary, in case where the S-SFH applying information indicates 0, S-SFH change state information currently being transmitted is actually applied to a system. A current system indicates that S-SFH change state information currently being transmitted is applied thereto.

In another embodiment, the S-SFH applying information is the same as S-SFH change state information currently being applied to a system. That is, the S-SFH applying information directly informs S-SFH change state information currently being applied to a system. For example, it is assumed that S-SFH change state information currently being transmitted is 0x01 and S-SFH change state information currently being applied to a system is 0x00. In this case, the S-SFH applying information is 0x00 which is the same as that of the S-SFH change state information currently being applied to a system.

In a situation where previous system information is actually applied to a system, a BS transmits new system information to a UE, and the BS informs the UE in advance for a certain period of time that the new system information will be actually applied to the system. Accordingly, a probability that a UE fails to update system information can be reduced.

Figure 3:
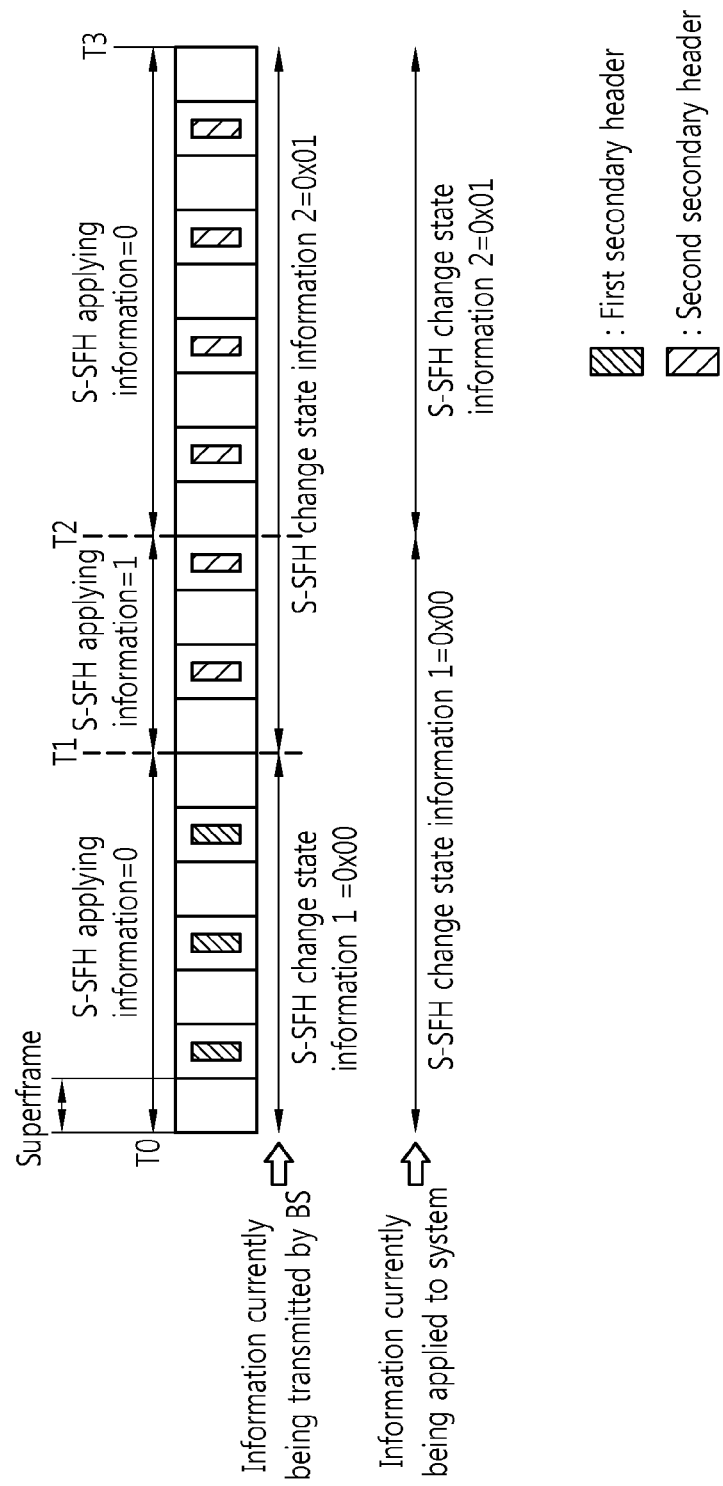
FIG. 3 is an explanatory diagram showing a method of transmitting system scheduling information according to an embodiment of the present invention.

FIG. 3 is an explanatory diagram showing a method of transmitting system scheduling information according to an embodiment of the present invention.

Referring to FIG. 3, the update of system information is classified into a system information pre-update step T0 to T1, a system information update preparation step T1 to T2, and a system information update completion step T2 to T3.

In the system information pre-update step T0 to T1, a BS transmits S-SFH change state information 1 through the primary header of each superframe. Further, the BS transmits a first secondary header pertinent to the S-SFH change state information 1 in a specific time period. Information currently applied to a system is regarding the S-SFH change state information 1. That is, system information currently being transmitted is identical with system information currently being applied to a system. Accordingly, S-SFH applying information indicates 0.

Next, in the system information update preparation step T1 to T2, the BS transmits new S-SFH change state information 1 and a second secondary header changed in response thereto through the primary header of each superframe. Information applied to the system is still regarding the previous S-SFH change state information 1. That is, system information currently being transmitted differs from system information currently being applied to a system. Accordingly, S-SFH applying information indicates 1. When the S-SFH applying information indicates 1, it means that although the S-SFH change state information 1 is currently applied to the system, new S-SFH change state information 2 will be soon applied the system. Accordingly, a UE receives and stores the S-SFH change state information 2.

In the system information update completion step T2 to T3, the BS is currently transmitting the new S-SFH change state information 2 and a second secondary header accordingly. Information currently applied to the system is the new S-SFH change state information 2. That is, system information currently being transmitted is identical with system information currently being applied to the system. Accordingly, S-SFH applying information indicates 0.

The UE can prepare for a reception failure of system information because it can receive system information to be updated and can be prepared.

In FIG. 3, the first secondary header and the second secondary header are illustrated to be transmitted every two superframes, but the technical spirit of the present invention is not limited thereto. For example, each secondary header can be transmitted over several superframes one or more times.

Figure 4:
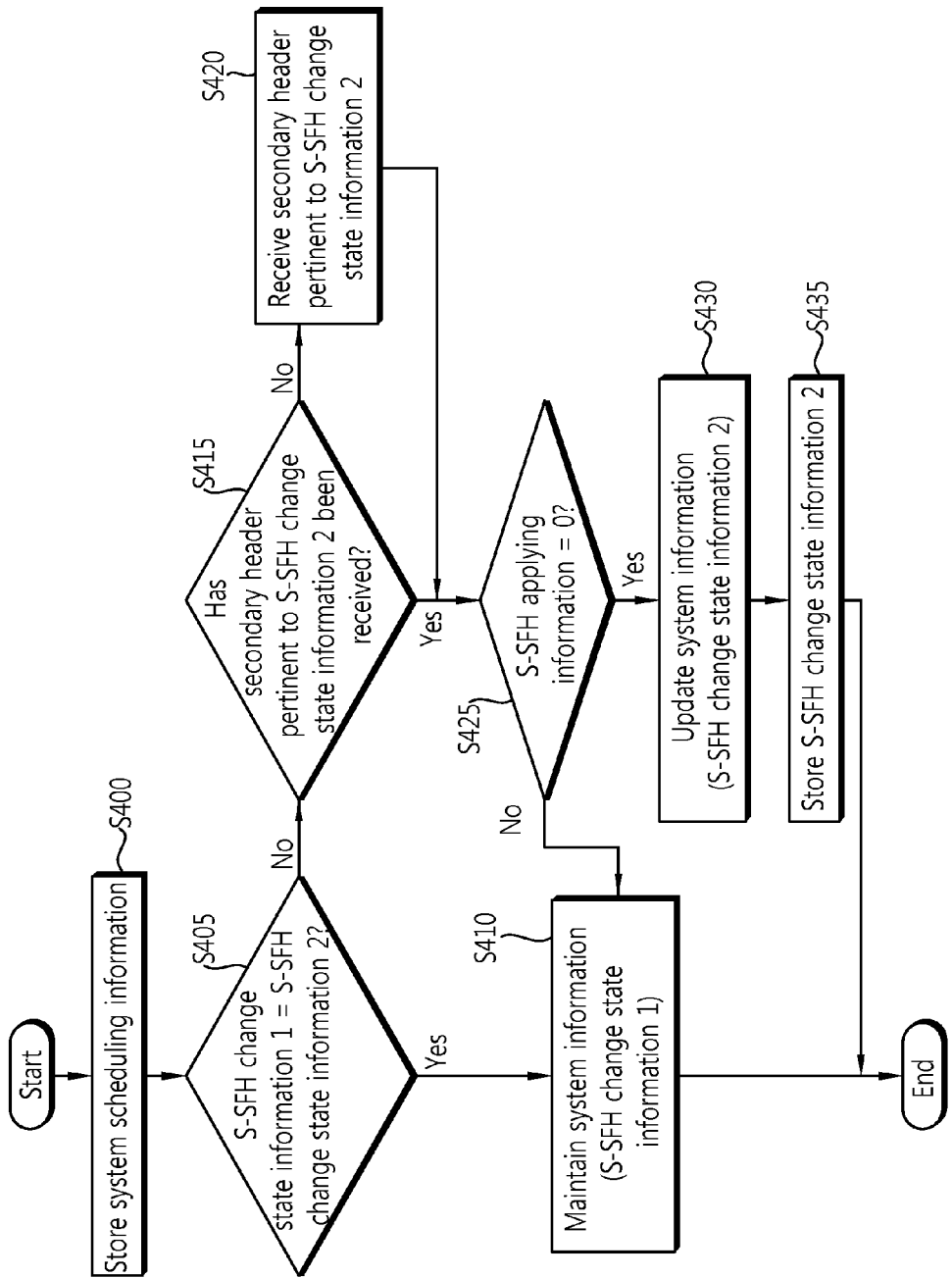
FIG. 4 is a flowchart illustrating a method of a UE updating system information according to an embodiment of the present invention.

FIG. 4 is a flowchart illustrating a method of a UE updating system information according to an embodiment of the present invention. A primary header includes system scheduling information (i.e., a set of pieces of information pertinent to the update of system information). A UE can know whether system information has been updated using system scheduling information.

Referring to FIG. 4, the UE receives system scheduling information, included in a primary header, whenever it reads the primary header and stores the read system scheduling information at step S400. The system scheduling information includes S-SFH change state information, an S-SFH change indicator, and S-SFH applying information.

The UE determines whether previously stored S-SFH change state information 1 is identical with newly received S-SFH change state information 2 with reference to the S-SFH change state information included in the system scheduling information at step S405. If, as a result of the determination, the S-SFH change state information 1 and the S-SFH change state information 2 are identical with each other, the UE does not receive a secondary header pertinent to the S-SFH change state information 2 and maintains the system information regarding the S-SFH change state information 1 at step S410. In case where the S-SFH change state information 1 is identical with the S-SFH change state information 2, the UE can continue to perform communication on the basis of system information according to a secondary header pertinent to the existing S-SFH change state information 1.

On the other hand, if, as a result of the determination, the S-SFH change state information 1 and the S-SFH change state information 2 are different from each other, the UE determines whether the secondary header pertinent to the S-SFH change state information 2 has been received at step S415. More particularly, the secondary header pertinent to the S-SFH change state information 2 is a secondary header which has been changed and indicated by an S-SFH change indicator.

If, as a result of the determination at step S415, the secondary header pertinent to the S-SFH change state information 2 has not been received, the UE receives the secondary header pertinent to the S-SFH change state information 2 at step S420 and then determines whether S-SFH applying information is 0 at step S425. On the other hand, if, as a result of the determination at step S415, the secondary header pertinent to the S-SFH change state information 2 has been received already, the UE determines whether the S-SFH applying information is 0 at step S425.

If, as a result of the determination at step S425, the S-SFH applying information is 1, it means that the system information has not yet been updated, and thus the UE maintains the system information at the S-SFH change state information 1 at step S410.

However, if, as a result of the determination at step S425, the S-SFH applying information is 0, it means that a BS has updated the system information on the basis of the S-SFH change state information 2, and thus the UE updates the system information to the S-SFH change state information 2 at step S430. Next, the UE stores the S-SFH change state information 2 at step S435.

As described above, if S-SFH change state information and S-SFH applying information are used, a UE can reduce a decoding load by selectively receiving new system information through S-SFH change state information and can also solve problems resulting from the failure to receive system information by previously receiving the new system information before applying it to a system. Further, a UE can clearly know whether system information applied thereto is up-to-date or must be updated because it can continuously monitor system information, currently applied to a BS, through the S-SFH applying information.

Figure 5:
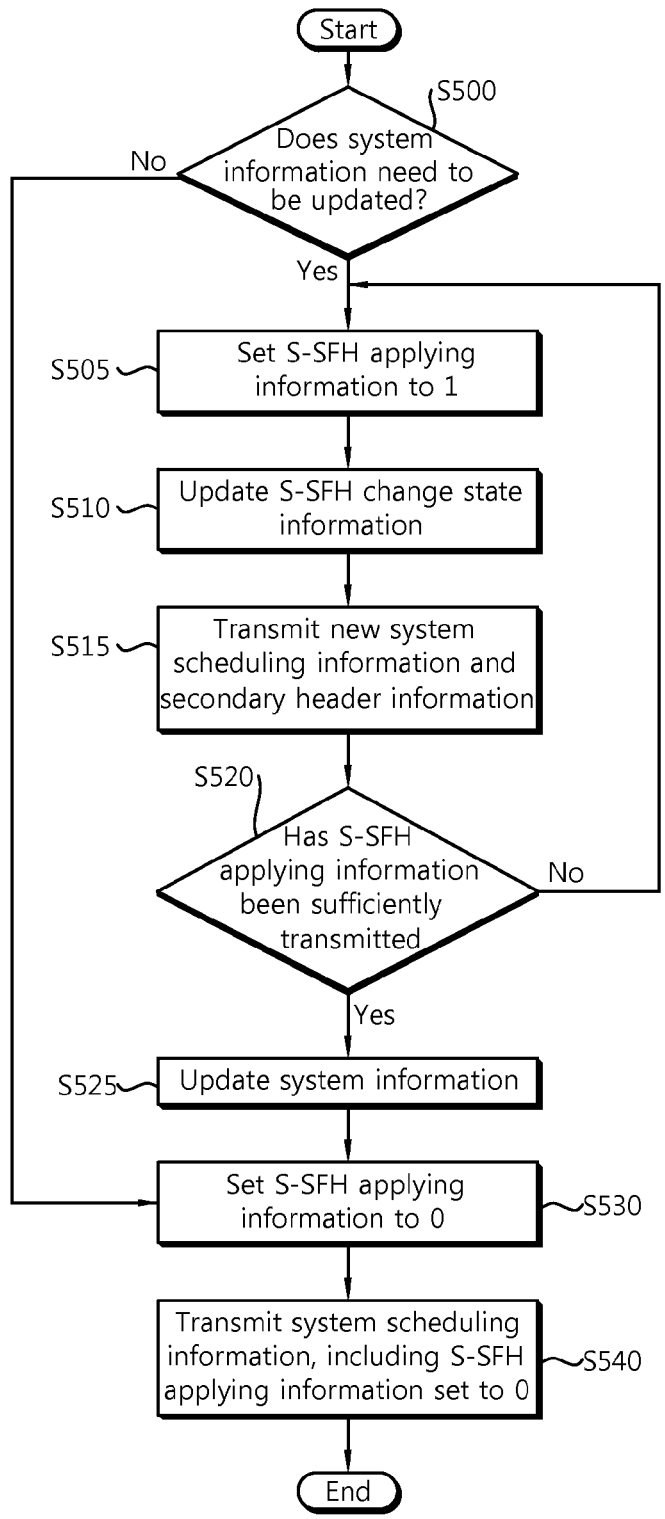
FIG. 5 is a flowchart illustrating a method of a BS updating system information according to an embodiment of the present invention.

FIG. 5 is a flowchart illustrating a method of a BS updating system information according to an embodiment of the present invention.

Referring to FIG. 5, the BS determines whether system information needs to be updated at step S500. If, as a result of the determination, the system information needs not to be updated, the BS sets S-SFH applying information to 0 at step S530. If, as a result of the determination, the system information needs to be updated, the BS sets the S-SFH applying information to 1 at step S505. Next, the BS updates S-SFH change state information at step S510. The update of the S-SFH change state information means that the S-SFH change state information is increased by 1 modulo 16.

The BS transmits new system scheduling information which includes the updated S-SFH change state information, an S-SFH change indicator based on the updated S-SFH change state information, and the S-SFH applying information set to 1, to a UE at step S515. The new system scheduling information is included in the primary header of each superframe and transmitted to the UE.

When the S-SFH applying information is 1, the UE can know that the S-SFH change state information currently being transmitted is different from the S-SFH change state information actually being applied to a system. Accordingly, although the UE receives the new system scheduling information, it maintains the system based on the previous S-SFH change state information.

The BS determines whether the S-SFH applying information set to 1 has been sufficiently transmitted at step S520. For example, in case where a secondary header subpacket 1 has been changed, the S-SFH applying information is repeatedly transmitted until the changed secondary header subpacket 1 is transmitted twice. For another example, in case where a secondary header subpacket 2 has been changed, the S-SFH applying information is repeatedly transmitted until the changed secondary header subpacket 2 is transmitted twice. For still another example, in case where a secondary header subpacket 3 has been changed, the S-SFH applying information is repeatedly transmitted until the changed secondary header subpacket 3 is once transmitted.

If, as a result of the determination at step S520, the S-SFH applying information set to 1 and the secondary header information have been sufficiently transmitted, the BS updates the system information at step S525. The update of the system information means that the updated S-SFH change state information is applied to the system. When the updated S-SFH change state information is applied to the system, the S-SFH change state information currently being transmitted becomes identical with the S-SFH change state information actually applied to the system. Thus, the BS sets the S-SFH applying information to 0 at step S530. Next, the BS repeatedly transmits new system scheduling information, including the S-SFH applying information set to 0 and the updated S-SFH change state information, to the UE at step S540.

Figure 6:
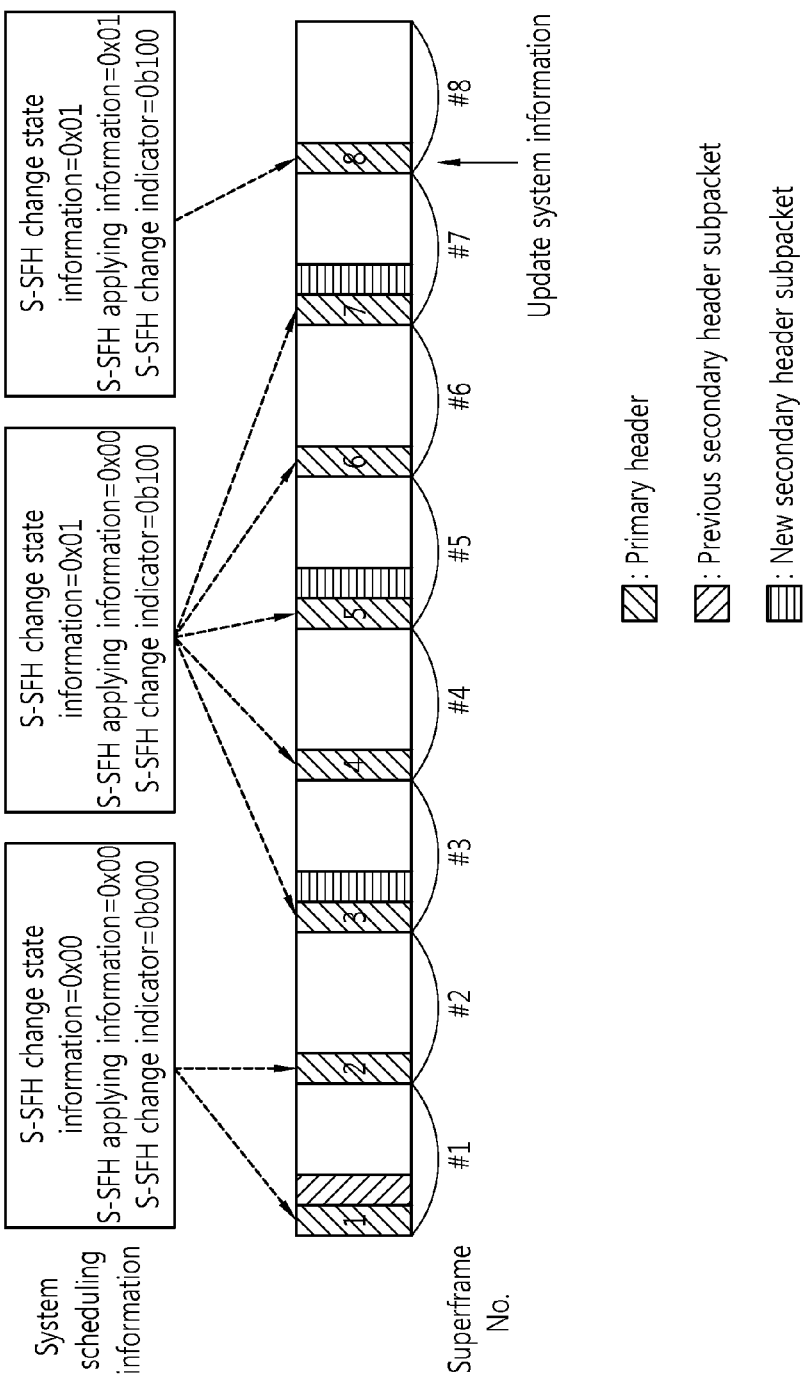
FIG. 6 is an explanatory diagram showing a method of transmitting system scheduling information according to another embodiment of the present invention.

FIG. 6 is an explanatory diagram showing a method of transmitting system scheduling information according to another embodiment of the present invention.

From FIG. 6, a process of changing system scheduling information over superframes #1 to #8 can be seen. Each of the superframes can include only a primary header or both a primary header and a secondary header subpacket. Further, each primary header includes system scheduling information, and the system scheduling information includes S-SFH change state information, S-SFH applying information, and an S-SFH change indicator.

The following table shows an example of a primary header format including the system scheduling information.

TABLE 3

| Syntax | Size (bit) | Notes |
| --- | --- | --- |
| LSB of Superframe Number | 4 | Portion of a superframe number |
| S-SFH Applying Information | 4 | Indicate S-SFH change state information applied to a current superframe |
| S-SFH Change State Information | 4 | Indicate S-SFH change state information being transmitted in a current superframe |
| S-SFH Size | 4 | Unit of an LRU |
| S-SFH Transmission Format | 2 | Indicate a transmission format used for a secondary header |
| S-SFH Scheduling Information Bitmap | 3 | 0b000: There is no secondary header If a first bit is 1, the secondary header includes P1, if a second bit is 1, the secondary header includes SP2, and if a third bit is 1, the secondary header includes SP3. |
| S-SFH Change Indicator | 3 | Indicate a change of a secondary header SPx IE. $0^{th}$ to second bits are mapped to a secondary header SP1 IE to a secondary header SP3 IE, respectively. |

In the superframes #1 and #2, both S-SFH change state information and S-SFH applying information are 0x00, and an S-SFH change indicator is 0b000. In case where a BS is sought to update system information, the BS first updates the S-SFH change state information to 0b01, thus notifying that the system information will be changed to new system information. The updated S-SFH change state information is repeatedly transmitted for a certain period of time so that it can be successfully received by all UEs. In FIG. 6, the S-SFH change state information updated into 0x01 over superframes #3 to #7 is repeatedly transmitted.

At the same time, the BS starts to send a new secondary header. Here, the S-SFH change indicator is updated into 0b100, thus indicating the new secondary header. However, the S-SFH applying information still indicates 0x00 which is the S-SFH change state information, currently applied to a system, before the update. This is for the purpose of applying the new system information after a change of the system information is notified for a sufficient period of time. Accordingly, a phenomenon in which a UE fails to update system information at a specific point of time can be minimized.

If it is determined that the system scheduling information has been transmitted for a certain period of time, the BS updates the system information starting from a superframe #8 on the basis of the S-SFH change indicator (i.e., 0b001) and then updates the S-SFH applying information to 0x01. Accordingly, the S-SFH applying information indicates the updated S-SFH change state information. Consequently, the value of the S-SFH change state information becomes identical with the value of the S-SFH applying information.

Figure 7:
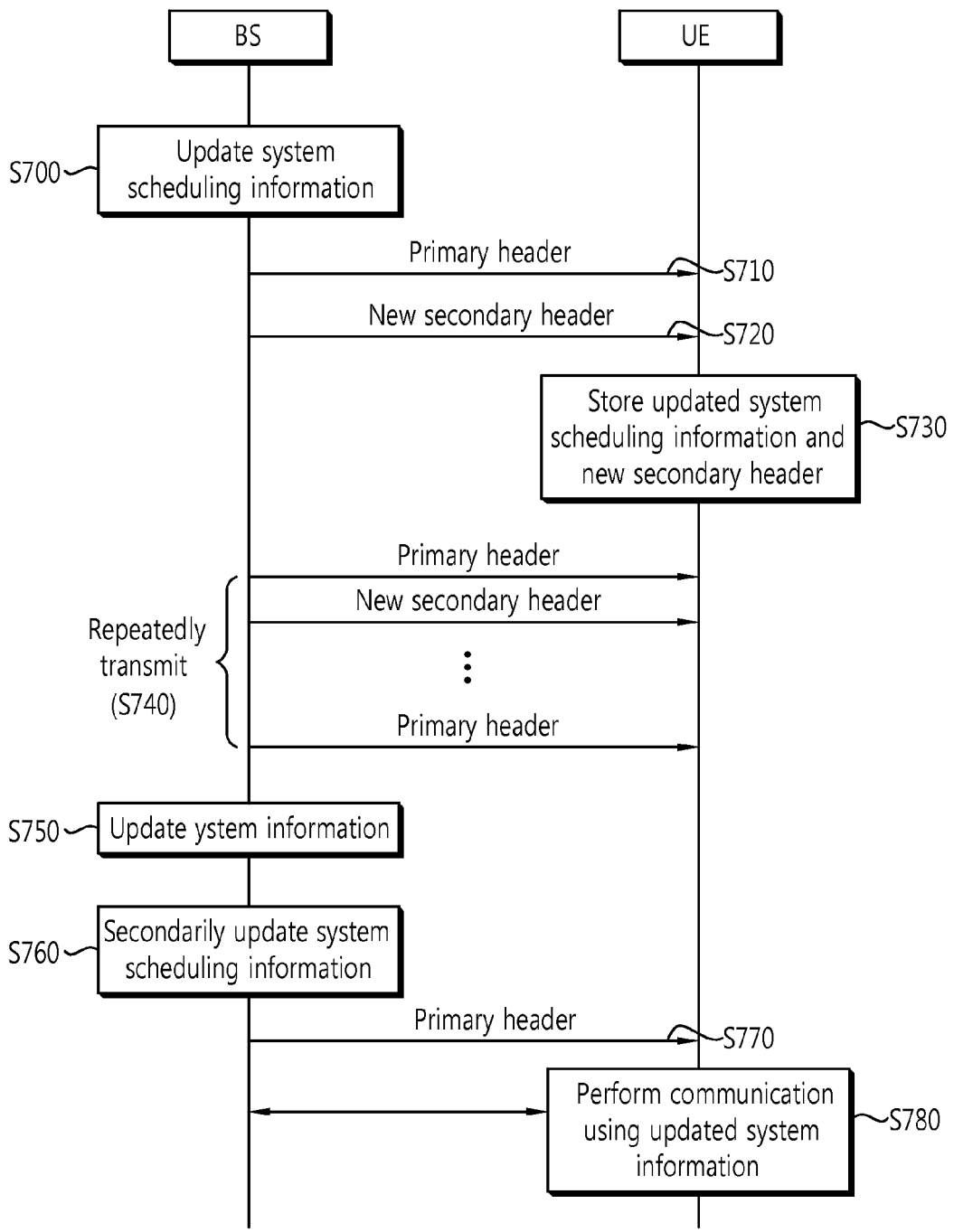
FIG. 7 is a flowchart illustrating a method of transmitting system information according to an embodiment of the present invention.

FIG. 7 is a flowchart illustrating a method of transmitting system information according to an embodiment of the present invention.

Referring to FIG. 7, a BS updates system scheduling information at step S700. The updated system scheduling information includes S-SFH change state information, S-SFH applying information, and an S-SFH change indicator. The S-SFH change state information is information increased from S-SFH change state information of a previous version by 1. Meanwhile, the S-SFH change indicator is changed to indicate a new secondary header relating to new system information. The S-SFH applying information indicates that S-SFH change state information currently being transmitted in a superframe is different from S-SFH change state information actually being applied to a system or S-SFH change state information actually applied to a system. The updated system scheduling information is carried on the primary header of a superframe.

The BS transmit the primary header to a UE at step S710. The BS transmits a new secondary header, becoming a cause to update the system scheduling information, to the UE at step S720. Here, the transmission of the new secondary header from the BS to the UE means that the new secondary header is broadcasted or multicasted so that it can be received by all UEs. The primary header and the new secondary header may be included in one superframe or different superframes.

The UE stores the updated system scheduling information and the new secondary header at step S730. The BS repeatedly transmits the primary header and the new secondary header a predetermined number of times N for M at step S740. The UE can know that the system information will be changed in the future on the basis of the updated system scheduling information and can determine a point of time at which the system information is updated by comparing the S-SFH change state information, the S-SFH applying information, and the S-SFH change indicator.

After repeatedly transmitting the primary header and the new secondary header a certain number of times, the BS updates the system information on the basis of a version of the S-SFH change state information at step S750 and secondarily updates the system scheduling information at step S760. Here, the S-SFH applying information is updated. The S-SFH applying information is changed to indicate that S-SFH change state information actually applied to a system is identical with S-SFH change state information currently being transmitted or S-SFH change state information actually applied to a system. The BS transmits a primary header, including the secondarily updated system scheduling information, to the UE at step S770. The UE determines that the system information has been updated on the basis of the secondarily updated system information and continues to perform communication with the BS on the basis of the updated system information at step S780.

As described above, before new system information is applied to a system, system scheduling information, notifying that updated system information will be updated, and a new secondary header are broadcasted several times so that all UEs within a cell can acquire the corresponding information, and the system is then updated. Although a UE fails to receive system information updated at a specific point of time, the UE can receive the updated system information at a different point of time before the updated system information is actually applied to a system. Accordingly, stable communication can be performed. Further, a UE can know when updated system information will be applied from which point of time on the basis of S-SFH applying information. Thus, there is an advantage in that a mobile UE being served can update system information without deterioration in the quality of service.

Figure 8:
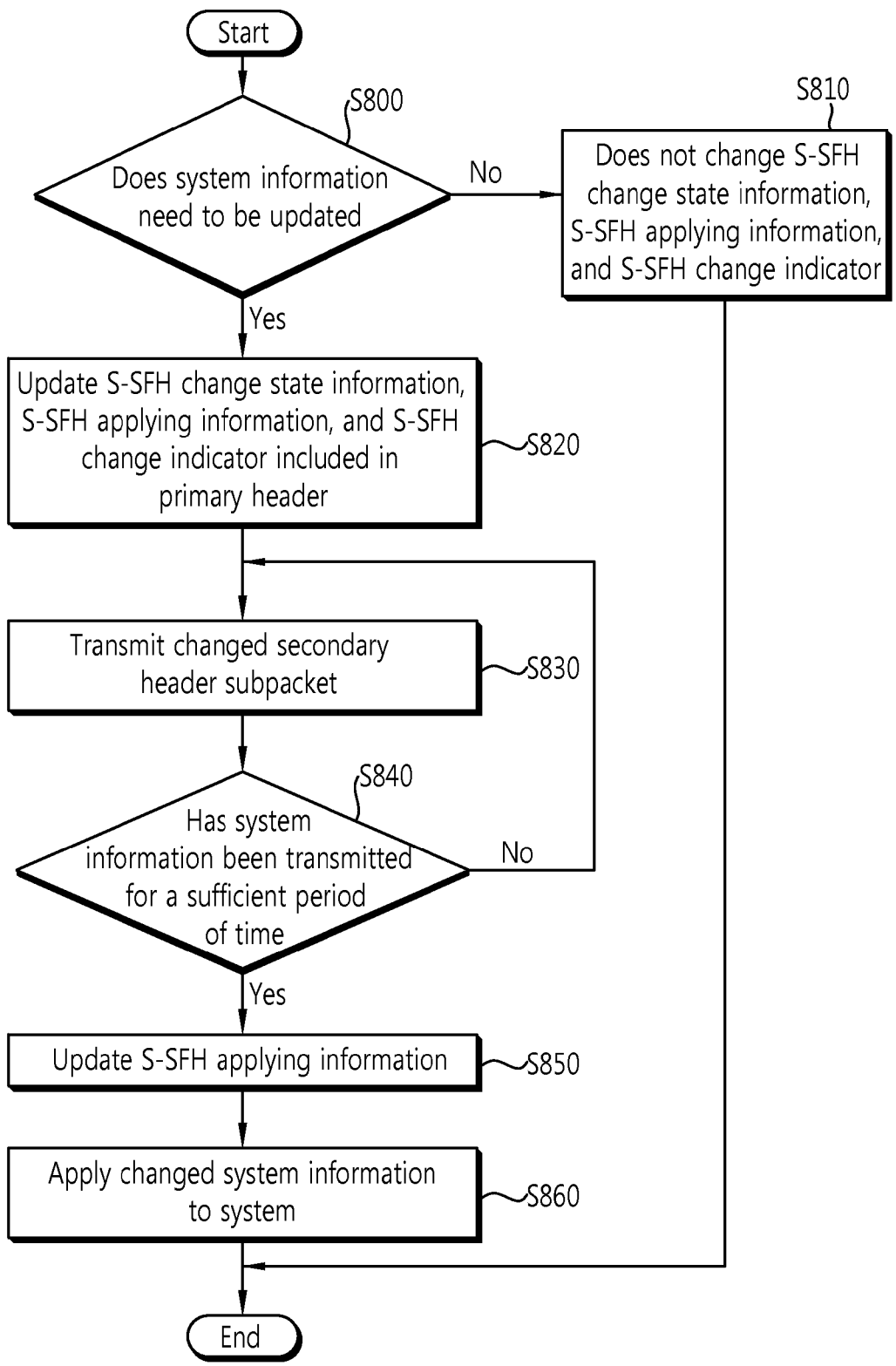
FIG. 8 is a flowchart illustrating a method of updating system information according to an embodiment of the present invention.

FIG. 8 is a flowchart illustrating a method of updating system information according to an embodiment of the present invention. This drawing shows a procedure performed from a standpoint of a BS.

Referring to FIG. 8, the BS determines whether system information needs to be updated at step S800. If, as a result of the determination, the system information does not need to be updated, the BS does not change S-SFH change state information, S-SFH applying information, and an S-SFH change indicator at step S810.

However, if, as a result of the determination, the system information needs to be updated, the BS updates the S-SFH change state information, the S-SFH change indicator, and the S-SFH applying information, included in a primary header, on the basis of changed information at step S820. For example, the S-SFH applying information can have 1 bit and indicate that S-SFH change state information currently applied to a system is different from S-SFH change state information currently being transmitted. For another example, the S-SFH applying information can have the same number of bits as S-SFH change state information and can be identical with the S-SFH change state information currently applied to a system.

The BS transmits changed secondary header subpackets to a UE at step S830.

The BS determines whether a system information message has been repeatedly transmitted for a sufficient and certain period of time at step S840. If, as a result of the determination, the system information message has been repeatedly transmitted for a sufficient and certain period of time, the BS updates the S-SFH applying information included in the primary header at step S850 and applies the changed system information to the system at step S860.

If, as a result of the determination, the system information message has not been repeatedly transmitted for a sufficient and certain period of time, the BS transmits the changed secondary header subpackets to the UE at step S830.

Through the above method, a BS can inform a UE of the update of system scheduling information and the update of system information.

Figure 9:
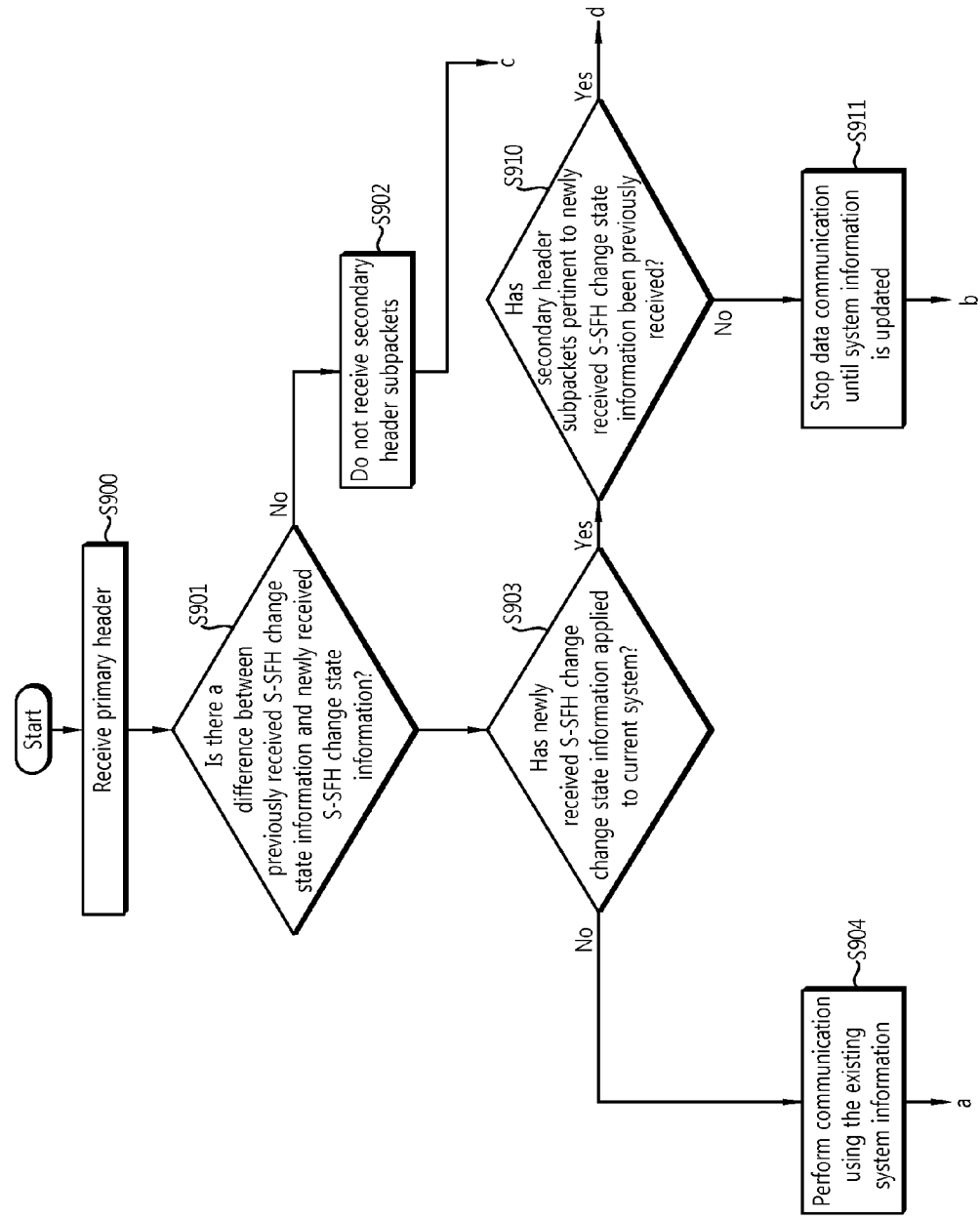
FIGS. 9 and 10 are flowcharts illustrating a method of updating system information according to another embodiment of the present invention.
Figure 10:
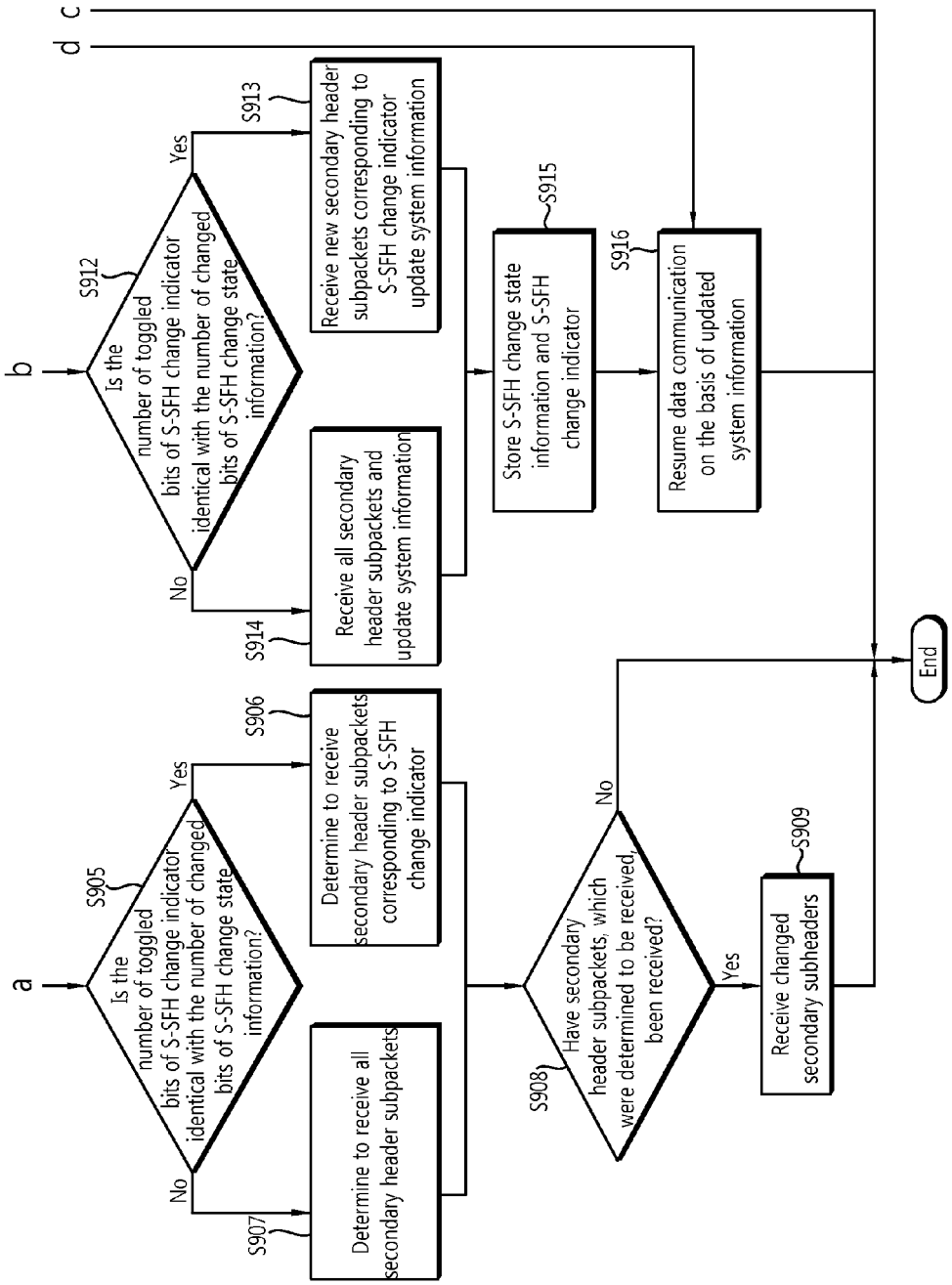

FIGS. 9 and 10 are flowcharts illustrating a method of updating system information according to another embodiment of the present invention. The drawings show procedures performed from a standpoint of a UE.

Referring to FIGS. 9 and 10, the UE receives a primary header at step S900. The primary header includes system scheduling information. The system scheduling information includes S-SFH change state information, S-SFH applying information, and an S-SFH change indicator. The UE determines whether there is a difference between S-SFH change state information received in a previous superframe and the S-SFH change state information received in a current superframe at step S901. If, as a result of the determination, the previously received S-SFH change state information is identical with the newly received S-SFH change state information, the UE determines that system information needs not to be updated and does not receive a secondary header included in the current superframe at step S902.

If, as a result of the determination, the previously received S-SFH change state information is different from the newly received S-SFH change state information, the UE determines whether the newly received S-SFH change state information has been applied to a current system with reference to the S-SFH applying information at step S903. For example, the S-SFH applying information can have 1 bit. If the S-SFH applying information indicates 1, it indicates that the previously received S-SFH change state information is applied to the current system. If the S-SFH applying information indicates 0, it indicates that the newly received S-SFH change state information is applied to the current system. For another example, the S-SFH applying information can have the same number of bits as the S-SFH change state information and indicate S-SFH change state information currently applied to a system. In either case, the UE can know S-SFH change state information currently applied to a system on the basis of the S-SFH applying information.

If, as a result of the determination at step S903, the previously received S-SFH change state information is being applied to the current system, it means that the update of the system information is scheduled, but not been actually performed, and thus the UE maintains access to the system using the existing system information at step S904.

Next, the UE determines whether the number of changed bits (i.e., a first bit number) between the previously received S-SFH change indicator and the newly received S-SFH change indicator is identical with the number of changed bits (i.e., a second bit number) between the previously received S-SFH change state information and the newly received S-SFH change state information at step S905.

If, as a result of the determination at step S905, the first bit number is identical with the second bit number, the UE determines to receive new secondary header subpackets which have been indicated to be changed in the S-SFH change indicator at step S906.

If, as a result of the determination at step S905, the first bit number is different from the second bit number, the UE determines that system information, managed by a BS, is out of synchronization with system information managed by a UE and thus determines to receive all the secondary header subpackets at step S907.

Next, the UE determines whether the secondary header subpackets determined to be received have been previously received at step S908.

If, as a result of the determination at step S908, the secondary header subpackets determined to be received have not been previously received, the UE receives the secondary header subpackets determined to be received at step S909.

If, as a result of the determination at step S908, the secondary header subpackets determined to be received have been previously received, the UE terminates the procedure.

Meanwhile, if, as a result of the determination at step S903, the newly received S-SFH change state information has been applied to the actual system, it means that the update of the system has been finished, and thus the UE determines whether secondary header subpackets pertinent to the newly received S-SFH change state information have been previously received at step S910.

If, as a result of the determination at step S910, the secondary header subpackets pertinent to the newly received S-SFH change state information have not been previously received, the UE stops data communication until the system information is updated on the basis of the S-SFH change indicator at step S911.

Next, the UE determines whether the number of changed bits (i.e., a third bit number) between the previously received S-SFH change indicator and the newly received S-SFH change indicator is identical with the number of changed bits (i.e., a fourth bit number) between the previously received S-SFH change state information and the newly received S-SFH change state information at step S912.

If, as a result of the determination at step S912, the third bit number is identical with the fourth bit number, the UE receives new secondary header subpackets that have been indicated to be changed in the S-SFH change indicator and updates the system information at step S913.

If, as a result of the determination at step S912, the third bit number is different from the fourth bit number, the UE determines that system information, managed by a BS, is out of synchronization with system information received and managed by a UE, and thus receives all the secondary header subpackets and updates the system information at step S914.

Next, the UE stores the S-SFH change state information and the S-SFH change indicator at step S915 and resumes data communication on the basis of the updated system information at step S916.

Meanwhile, if, as a result of the determination at step S910, the secondary header subpackets pertinent to the newly received S-SFH change state information have been previously received, the UE resumes data communication on the basis of the updated system information at step S916.

While the invention has been shown and described with respect to the preferred embodiments, it will be understood by those skilled in the art that various changes and modifications may be made without departing from the spirit and scope of the invention as defined in the following claims.

What is claimed is:

1. A method of updating system information using a superframe structure in a wireless communication system performed by a Base Station (BS), the method comprising:
    transmitting a primary header including system scheduling information regarding an update of the system information; and
    transmitting an updated secondary header including the update of the system information,
    wherein the system scheduling information comprises a secondary header change count indicating a change state of the updated secondary header, secondary header applying information indicating whether the secondary header change count is applied to the current superframe or a secondary header change count for a previous version of the secondary header is applied to the current superframe, and a secondary header change indicator indicating a specific type of the updated secondary header,
    wherein the superframe structure comprises a superframe header and a plurality of frames, the superframe header comprises the primary header and the secondary header, and the secondary header is categorized into a plurality of subpackets corresponding to a plurality of specific types,
    wherein the secondary header change count is incremented by 1 count when parameters constituting the secondary header are updated.

2. The method of claim 1, wherein the secondary header applying information is identical to a secondary header change count applied to the current system.

3. The method of claim 1, wherein the secondary header applying information is transmitted one or more times through the primary header depending on a type of the updated secondary header.

4. The method of claim 3, wherein the secondary header applying information changes after the secondary header applying information is transmitted one or more times.

5. The method of claim 3, wherein the updated secondary header is transmitted one or more times.

6. The method of claim 1, wherein the primary header includes at least one Orthogonal Frequency Division Multiplexing (OFDM) symbol of the superframe.

7. A method of updating system information using a superframe structure in a wireless communication system performed by User Equipment (UE), the method comprising:
    receiving, from a Base Station (BS), a primary header comprising a first secondary header change count indicating a change state of a current secondary header, secondary header applying information indicating which any one is applied to the current superframe between the first secondary header change count and a second secondary header change count which is a previous version of the first secondary header change count, and a secondary header change indicator indicating a specific type of the current secondary header; and
    applying the first secondary header change count to the system if the secondary header applying information indicates the first secondary header change count,
    wherein the superframe structure comprises a superframe header and a plurality of frames, the superframe header comprises the primary header and the secondary header, and the secondary header is categorized into a plurality of subpackets corresponding to a plurality of specific types,
    wherein the secondary header change count is incremented by 1 count when parameters constituting the secondary header are updated.

8. The method of claim 7, further comprising performing communication with the BS without updating the system information, if the secondary header applying information indicates the second secondary header change count.

9. The method of claim 7, wherein the secondary header applying information is transmitted one or more times through the primary header depending on a type of the current secondary header.

10. The method of claim 7, wherein the secondary header applying information is identical with either the first secondary header change count or the second secondary header change count.

11. The method of claim 7, wherein:
    the primary header further comprises a secondary header change indicator indicating an updated secondary header, and
    the updated secondary header provides a cause that the second secondary header change count is updated to the first secondary header change count.

12. The method of claim 11, further comprising receiving the updated secondary header one or more times.

13. A method of updating system information using a superframe structure in a wireless communication system performed by a Base Station (BS), the method comprising:
    transmitting a primary header containing system scheduling information, the system scheduling information including a scheduling information bitmap, a secondary header change count indicating a change state of an updated secondary header, a secondary header change indicator indicating a specific type of the updated secondary header that is changed, and secondary header applying information indicating whether the secondary header change count is applied to the current superframe or a secondary header change count for a previous version of the secondary header is applied to the current superframe; and
    transmitting the updated secondary header,
    wherein the superframe structure comprises a superframe header and a plurality of frames, the superframe header comprises the primary header and the secondary header, and the secondary header is categorized into a plurality of subpackets corresponding to a plurality of specific types, wherein the secondary header change count is incremented by 1 count when parameters constituting the secondary header are updated.

\* \* \* \* \*